US012633624B2

(12) United States Patent　(10) Patent No.:　US 12,633,624 B2

Lee et al.　(45) Date of Patent:　May 19, 2026

(54) RECHARGEABLE BATTERY PACK

(71) Applicant: Samsung SDI Co., Ltd., Yongin-si (KR)

(72) Inventors: Hyeok Lee, Yongin-si (KR); Kilseok Lee, Yongin-si (KR); Soomin Ahn, Yongin-si (KR); Beomjoo Kim, Yongin-si (KR); Jaeho Kim, Yongin-si (KR); Heonhee Kim, Yongin-si (KR); Jisoon Lim, Yongin-si (KR); Eungi Heo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 260 days.

(21) Appl. No.: 17/248,880

(22) Filed: Feb. 11, 2021

(65) Prior Publication Data

US 2021/0265704 A1　Aug. 26, 2021

(30) Foreign Application Priority Data

Feb. 25, 2020　(KR) ........................ 10-2020-0022959

(51) Int. Cl.
　H01M 50/507　(2021.01)
　H01M 50/503　(2021.01)
(52) U.S. Cl.
　CPC ....... H01M 50/507 (2021.01); H01M 50/503 (2021.01)
(58) Field of Classification Search
　CPC ......... H01M 50/20; H01M 50/50–512; H01M 10/0422; H01M 10/291; H01M 10/625; H01M 10/6553; H01M 10/6554; H01M 50/507; H01M 50/503; H01M 50/213;

H01M 50/289; H01M 50/55; H01M 50/204; H01M 50/258; H01M 50/24; H01M 50/249; H01M 50/567; H01M 50/528;

(Continued)

(56) References Cited

U.S. PATENT DOCUMENTS

2015/0072211 A1* 3/2015 Nakamura ............ H01M 50/20
　　　　　　　　　　　　　　　　429/121
2016/0172642 A1　6/2016 Hughes et al.

(Continued)

FOREIGN PATENT DOCUMENTS

KR　10-2017-0093956 A　8/2017
KR　10-2018-0115538 A　10/2018

OTHER PUBLICATIONS

Korean Office Action corresponding to KR Application No. 10-2020-0022959, dated May 30, 2025 (10 pages).

*Primary Examiner* — Allison Bourke
*Assistant Examiner* — Bethany C Garcia
(74) *Attorney, Agent, or Firm* — Womble Bond Dickinson (US) LLP

(57)　　ABSTRACT

A rechargeable battery pack includes: a battery housing having an accommodation space; a plurality of cell modules in the accommodation space an having a plurality of unit battery cells connected to each other, and obliquely arranged; a holder part supporting the cell module inside the battery housing; and a bus bar at an upper side of the holder part and connecting electrode terminals of the unit battery cells, wherein the bus bar is between the cell modules at the upper side of the holder, and a lead part connected to the electrode terminal is obliquely protruded from at least one side of the bus bar.

17 Claims, 13 Drawing Sheets

(58) Field of Classification Search
CPC ............. H01M 50/509; H01M 50/548; H01M
50/291; H01M 50/271; H01M 50/559;
H01M 2220/20; H01M 50/505; H01M
50/209; H01M 50/244; H01M 50/502;
H01M 50/553; H01M 50/224; H01M
50/242; H01M 50/298; H01M 50/543;
H01M 10/6568; H01M 10/61; H01M
10/6556; H02G 5/00–005; H02G 5/04;
H02G 5/06–10; Y02E 60/10; Y02P 70/50;
Y02T 10/70; H01R 9/2675; H01R 4/242;
H01R 4/48185; H01R 4/4846; H01R
4/485; H01R 9/26; B60L 50/50; B60L
50/64
See application file for complete search history.

(56)                    References Cited

U.S. PATENT DOCUMENTS

2017/0256770 A1*    9/2017   Wynn  .................. H01M 50/213
2018/0212222 A1*    7/2018   Barton  .............. H01M 50/3425

* cited by examiner

RECHARGEABLE BATTERY PACK

CROSS-REFERENCE TO RELATED APPLICATION

The present application claims priority to and the benefit of Korean Patent Application No. 10-2020-0022959 filed in the Korean Intellectual Property Office on Feb. 25, 2020, the entire content of which is incorporated herein by reference.

BACKGROUND

1. Field

The present invention relates to a rechargeable battery pack in which durability may be improved by a stable arrangement of bus bars.

2. Description of the Related Art

A rechargeable battery is a battery that may be repeatedly charged and discharged, unlike a primary battery, which may generally only be charged and discharged a single time. A small-capacity rechargeable battery may be utilized for portable small electronic devices such as mobile phones, laptop computers, and camcorders, and large-capacity rechargeable battery may be used as a power source for driving a motor of an electric bicycle, a scooter, an electric vehicle, or a fork lift.

The rechargeable battery may be used as one unit battery cell, but may be used as a rechargeable battery pack in which a plurality of unit battery cells are connected in parallel or in series in order to implement a large-capacity battery. For example, the rechargeable battery pack may have a structure that uses a tab for connecting a plurality of unit battery cells in series or in parallel and draws out current from a tab of one side thereof.

When a plurality of unit battery cells are used, the rechargeable battery pack may have a structure that may effectively dissipates heat generated while being charged and discharged for satisfying high power and may effectively fix the unit battery cells for preventing or reducing impact and vibration.

Meanwhile, the unit battery cells may be fixed in cell module units by a holder inside a battery housing, and a plurality of bus bars may be connected to an electrode terminal.

However, there is a problem that durability or functionality may decrease or diminish over time due to frequent occurrence of short-circuits due to interference between and incorrect insertion of parts in a process in which the plurality of bus bars are arranged to be connected to the electrode terminals of the cell modules.

The above information disclosed in this Background section is only for enhancement of understanding of the background and therefore the information discussed in this Background section does not necessarily constitute prior art.

SUMMARY

Aspects of some example embodiments of the present invention may provide a rechargeable battery pack that may prevent or reduce interference and misassembly of bus bars and in which cell modules may be stably connected.

According to some example embodiments of the present invention, a rechargeable battery pack includes: a battery housing having an accommodation space formed therein; a plurality of cell modules inserted into the accommodation space, configured of a plurality of unit battery cells connected to each other and obliquely arranged; a holder part supporting the cell module inside the battery housing; and a bus bar at an upper side of the holder part to connect electrode terminals of the unit battery cells.

According to some example embodiments, the bus bar may be between the cell modules at the upper side of the holder, and a lead part connected to the electrode terminal may be obliquely protruded from at least one side of the bus bar.

According to some example embodiments, a plurality of through-holes through which the electrode terminal of the unit battery cell is exposed may be formed in the upper side of the holder part.

According to some example embodiments, the through-holes may form a plurality of columns and rows on the upper side of the holder part, and may be obliquely formed to correspond to arrangement of the cell modules.

According to some example embodiments, the bus bar may include: a plurality of first bus bars arranged in a pair at both sides of an edge of the upper side of the holder part and connected to the electrode terminal; and a plurality of second bus bars between a pair of the first bus bars in the holder part and connected to the electrode terminal.

According to some example embodiments, the first bus bar may include: a first body part having a long length in a first direction between the through-holes at both sides of the edge of the holder part; and a plurality of first lead parts that are obliquely protruded in a second direction crossing the first direction from a side of the first body part to be inserted between the through-holes.

According to some example embodiments, the first lead part may be protruded from a side of the body part at an angle ranging from 45 degrees to 60 degrees.

According to some example embodiments, the first lead part and the electrode terminal of the cell module may be connected by a wire member at the upper side of the holder part.

According to some example embodiments, the second bus bar may include: a second body part having a long length in the first direction between the through-holes; and a plurality of second lead parts obliquely protruding in a second direction crossing the first direction from both sides of the second body part.

According to some example embodiments, the second lead part may include: a plurality of first extensions obliquely protruding in the second direction crossing the first direction from one side of the second body part; and a plurality of second extensions obliquely protruding in a direction opposite to the second direction from the other side of the second body part.

According to some example embodiments, a plurality of the second bus bar may be between a plurality of columns of the through-holes at the upper side of the holder part, and the second lead part may be protruded from a side of the second bus bar to be between a plurality of rows of the through-holes.

According to some example embodiments, the second lead part and the electrode terminal of the cell module may be electrically connected by a wire member at the upper side of the holder part.

According to some example embodiments, the bus bar may include: a plurality of first composite bus bars at an edge of the upper side of the holder part to be connected to the electrode terminal; and a plurality of second composite bus bars at a side of the first composite bus bar at the upper side of the holder part to be connected to the electrode terminal.

According to some example embodiments, a lead protrusion that is electrically connected to the electrode terminal may be protruded from each of the first composite bus bars and the second composite bus bar.

According to some example embodiments, the first composite bus bar may include: a first body part having a long length in the first direction at side surfaces of the through-holes at both edges of the upper side of the holder part; and a plurality of first composite lead parts obliquely protruding in the second direction crossing the first direction from the side of the first body part.

According to some example embodiments, a lead protrusion connected to the electrode terminal may be protruded from a side of the first composite lead part.

According to some example embodiments, the first composite lead part may be protruded from a side of the body part at an angle ranging from 45 degrees to 60 degrees.

According to some example embodiments, the lead protrusion may be electrically connected to a positive electrode of the electrode terminal.

According to some example embodiments, the second composite bus bar may include: a second body part having a long length in the first direction between the through-holes of the holder part; and a plurality of second composite lead parts obliquely protruding in the second direction crossing the first direction from both sides of the second body part.

According to some example embodiments, the second composite lead part may be protruded from each of both opposite sides of the second body part, and a lead protrusion electrically connected to the electrode terminal may be protruded from a side of the second composite lead part.

According to some example embodiments, the second composite lead part may include: a plurality of first composite extensions obliquely protruding in the second direction crossing the first direction from one side of the second body part; and a plurality of second composite extensions obliquely protruding in a direction opposite to the second direction from the other side of the second body part.

According to some example embodiments, a lead protrusion connected to the electrode terminal may be protruded from a side of each of the first composite extension and the second composite extension.

According to some example embodiments, the lead protrusion may be electrically connected to a positive electrode of the electrode terminal.

According to some example embodiments, the second composite extension may be electrically connected to a negative electrode of the electrode terminal of the cell module by a wire member.

According to some example embodiments, a stopper protrusion fixing a position of the bus bar may protrude from the holder part.

According to some example embodiments, the stopper protrusion may be protruded from the upper side of the holder part in a pair with the body part therebetween.

According to some example embodiments, a guide protrusion may be protruded from the through-hole.

According to some example embodiments of the present invention, because a plurality of bus bars are located at an upper side of a holder, and a lead part connecting an electrode terminal of a cell module obliquely protrudes, it may be possible to prevent or reduce misassembly and interference of the bus bars. Therefore, it may be possible to effectively prevent or reduce durability from being weakened and a short-circuit from occurring due to interference and misassembly of the bus bars.

DETAILED DESCRIPTION

Figure 1:
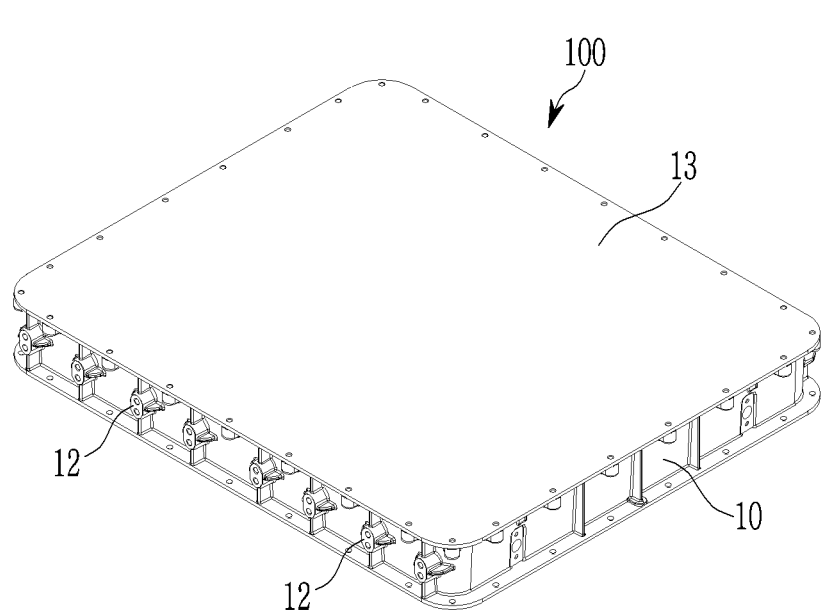
FIG. 1 illustrates a schematic perspective view of a rechargeable battery pack according to some example embodiments of the present invention.

Aspects of some example embodiments of the present invention will be described more fully hereinafter with reference to the accompanying drawings, in which embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
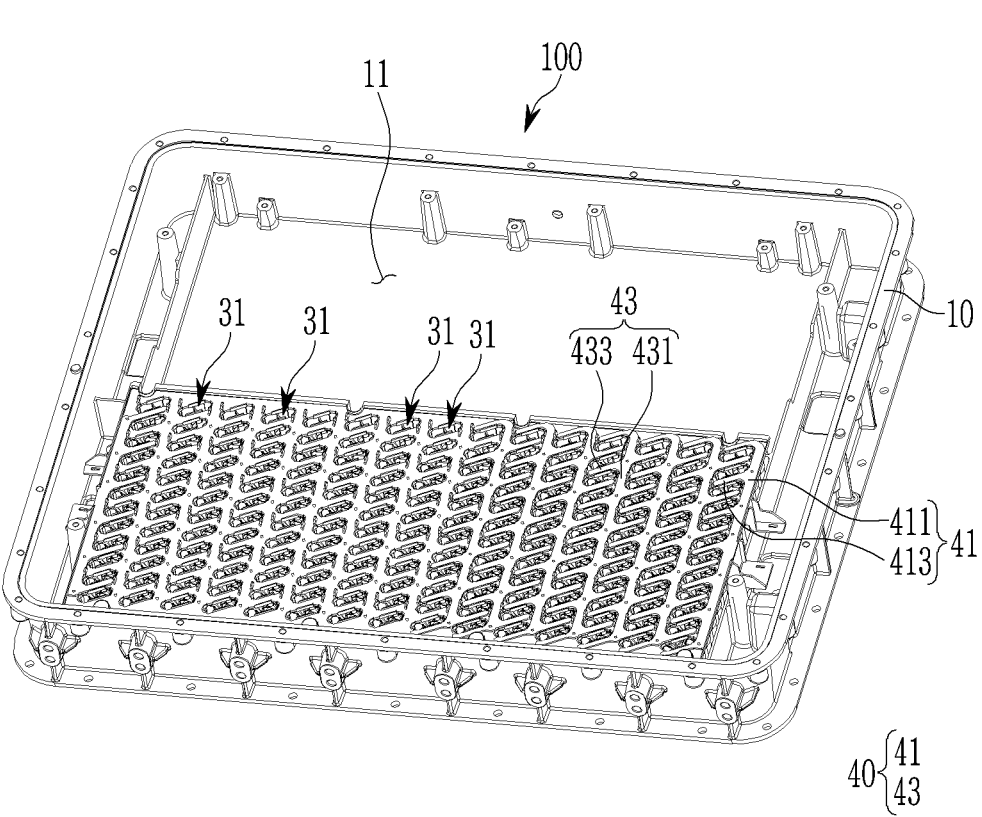
FIG. 2 schematically illustrates a perspective view of a state in which a bus bar connects a cell module to a portion of an accommodation space in a state in which a cover part of the rechargeable battery pack of FIG. 1 is removed.
Figure 3:
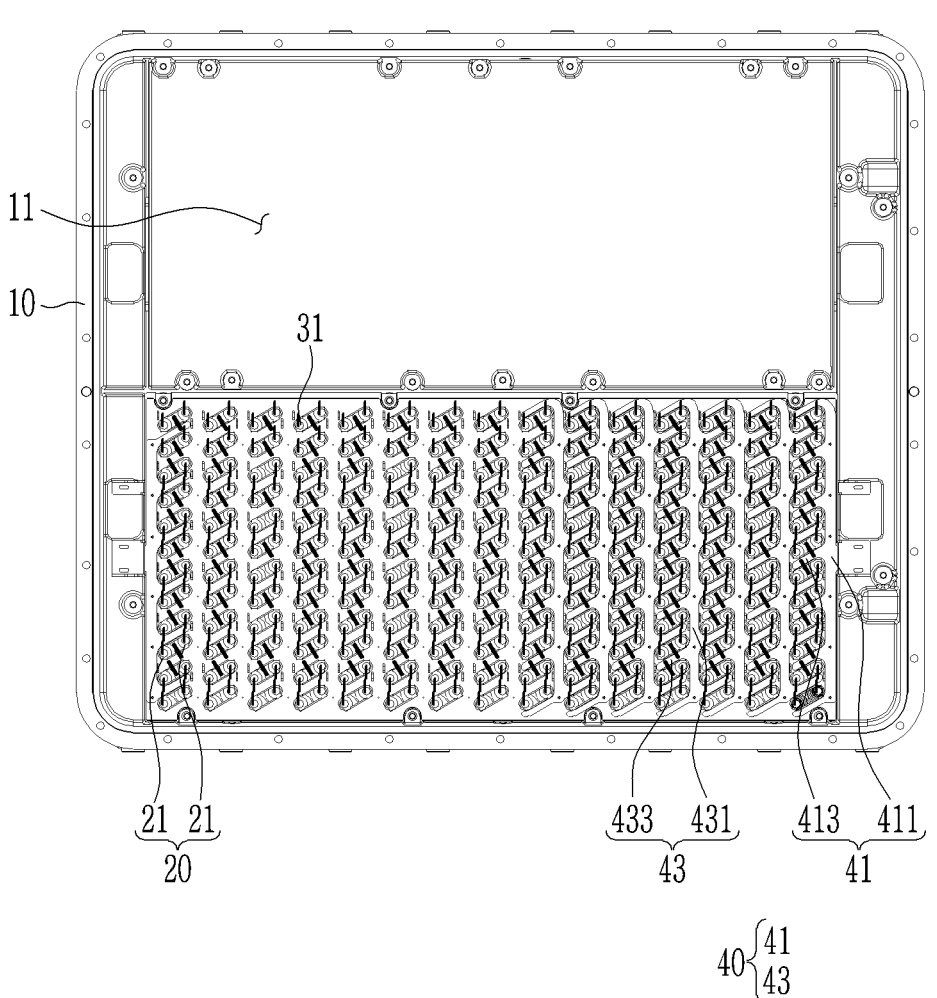
FIG. 3 schematically illustrates a top plan view of a state in which a bus bar connects a cell module to a portion of an accommodation space in a state in which a cover part of the rechargeable battery pack of FIG. 1 is removed.

FIG. 1 illustrates a schematic perspective view of a rechargeable battery pack according to some example embodiments of the present invention of the present invention, FIG. 2 schematically illustrate a perspective view of a state in which a bus bar connects a cell module to a portion of an accommodation space in a state in which a cover part of the rechargeable battery pack of FIG. 1 is removed, and FIG. 3 schematically illustrates a top plan view of a state in which a bus bar is located to connect a cell module to a portion of an accommodation space in a state in which a cover part of the rechargeable battery pack of FIG. 1 is removed.

As shown in FIG. 1 to FIG. 3, a rechargeable battery pack 100 according to some example embodiments of the present invention of the present invention includes a battery housing 10 having an accommodation space 11 formed therein, a plurality of cell modules 20 that is inserted in the accommodation space 11 and in which a plurality of unit battery cells 21 are located to be connected to be inclined, a holder part 30 (see FIG. 6) supporting the cell module 20 in the battery housing 10, and a bus bar 40 connecting electrode terminals of the unit battery cells 21 at an upper side of the holder part 30.

The battery housing 10 may be formed in a rectangular parallelepiped shape according to some example embodiments, and the accommodation space 11 may be formed therein. The cell module 20 may be accommodated in the accommodation space 11 of the battery housing 10. The battery housing 10 may be closed and sealed with a cover part 13 in a state in which the cell module 20 is accommodated therein. A cooling water input/output part 12 may be formed on a side surface of the battery housing 10.

The cell module 20 may be configured of two unit battery cells 21 made of a rechargeable battery. The unit battery cell 21 may be connected to the bus bar 40 to be described later.

The unit battery cell 21 may configured of a typical cylindrical rechargeable battery in which charging and discharging are repeatedly performed.

The cell module 20 may be positioned inside the battery housing 10 by being fixed by the holder part 30 inside the battery housing 10 in a state of being arranged in a matrix configuration of a plurality of columns and rows inside the battery housing 10.

The cell module 20 may be obliquely arranged inside the battery housing 10, for example, in a matrix of rows and columns, and the cell module 20 may be oblique (for example, arranged at an angle that is less than 90 degrees relative to the extension direction of the rows and columns) between with respect to an extension direction of the rows and columns. The cell module 20 may be arranged at an inclination or inclined angle corresponding to an inclination or inclined angle of a first lead part to be described later.

A through-hole 31 through which an electrode terminal of the cell module 20 is exposed may be formed in an upper portion of the holder part 30 in a state in which the cell module 20 is inserted into the holder part 30.

The through-hole 31 may be formed in the holder part 30 in an inclined state at an angle corresponding to the inclination angle of the cell module 20.

The through-hole 31 may be formed in a plurality of columns and rows at an upper side of the holder part 30. As such, the through-hole 31 is formed in the holder part 30 in order to electrically connect the electrode terminal formed in the unit battery cell 21 of the cell module 20 and the bus bar 40.

A plurality of the bus bars 40 may be located at the upper side of the holder part 30 to be connected to the electrode terminals of the unit battery cells 21.

Figure 4:
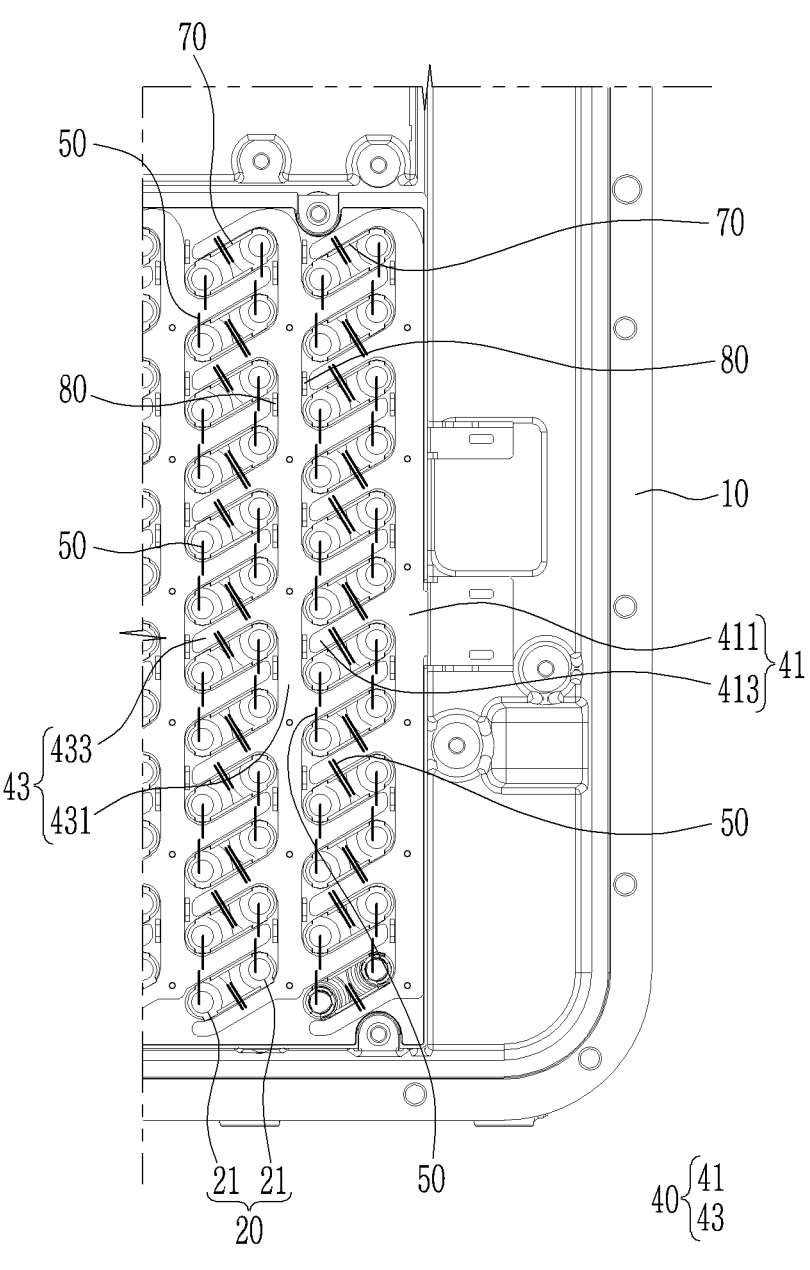
FIG. 4 schematically illustrates a schematic view of a portion of a state in which the bus bar of FIG. 3 is located.
Figure 5:
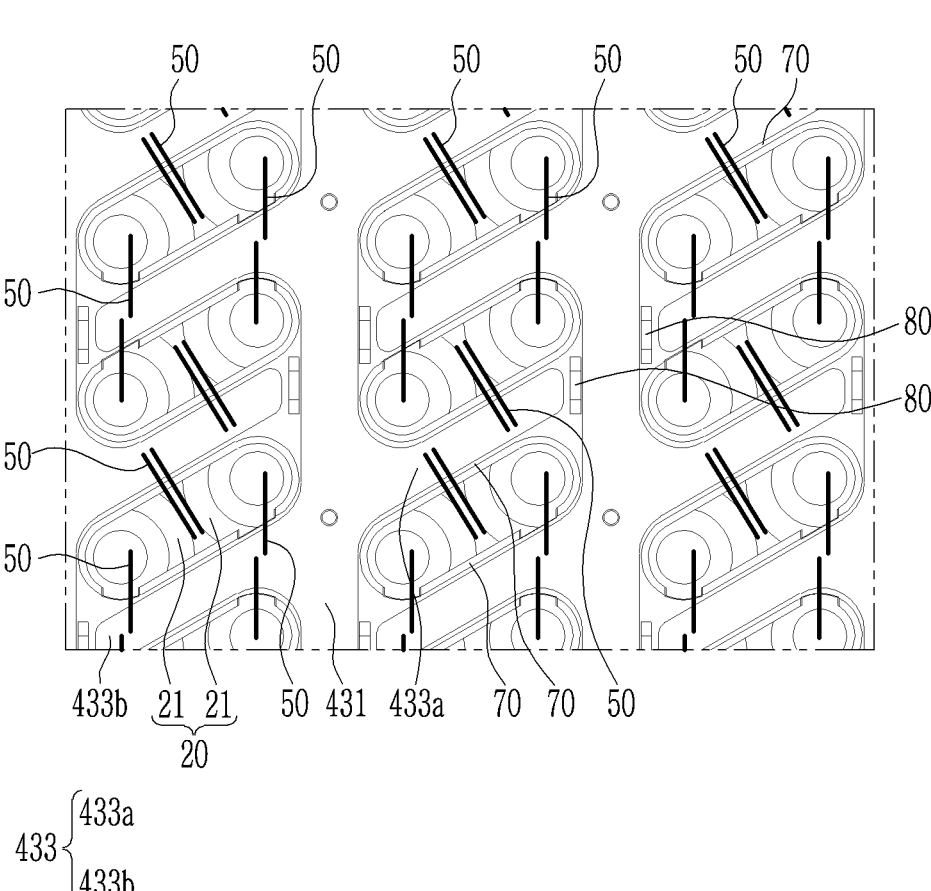
FIG. 5 schematically illustrates a schematic view of a state in which a bus bar according to some example embodiments of the present invention of the present invention is connected to a cell module.

FIG. 4 schematically illustrate a schematic view of a portion of a state in which the bus bar of FIG. 3 is located, FIG. 5 schematically illustrates a schematic view of a state in which a bus bar according to some example embodiments of the present invention is connected to a cell module, FIG.

Figure 7:
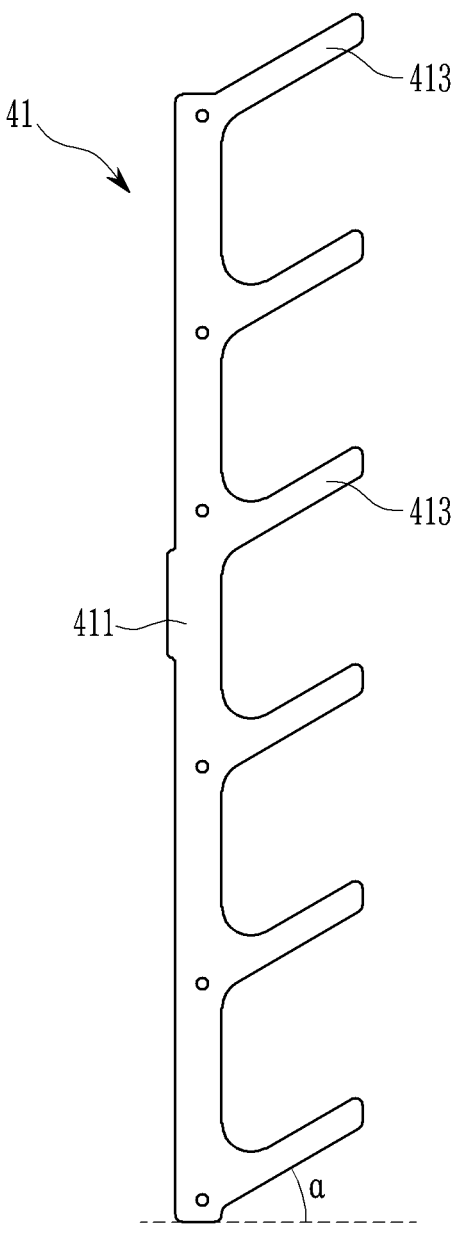
FIG. 7 schematically illustrates a top plan view of a first bus bar according to some example embodiments of the present invention of the present invention.
Figure 8:
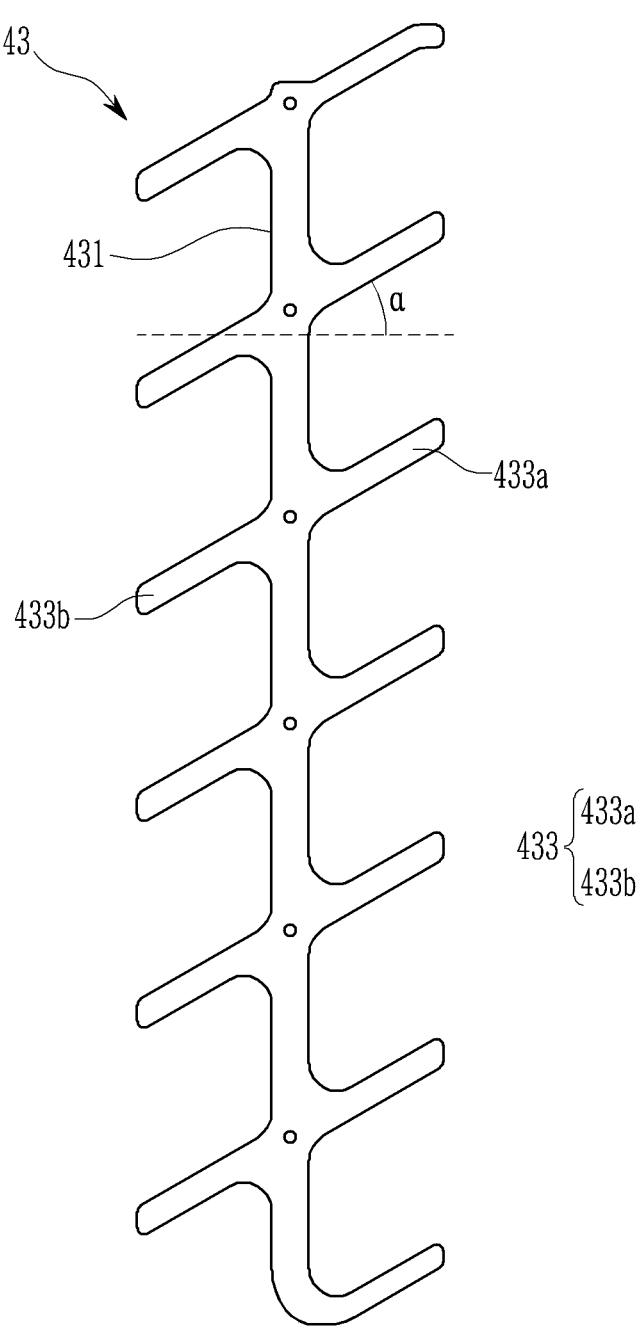
FIG. 8 schematically illustrates a top plan view of a second bus bar according to some example embodiments of the present invention of the present invention.

6 illustrates a schematic perspective view of a state in which a bus bar is removed in FIG. 5, FIG. 7 schematically illustrates a top plan view of a first bus bar according to some example embodiments of the present invention, and FIG. 8 schematically illustrates a top plan view of a second bus bar according to some example embodiments of the present invention.

As shown in FIG. 4 to FIG. 8, the bus bar 40 may include two first bus bars 41 located at both sides of an upper edge of the holder part 30 to be connected to the electrode terminal, and a plurality of second bus bars 43 located between the two first bus bars 41 at the upper side of the holder part 30 to be connected to the electrode terminal.

The first bus bar 41 may be installed at both edges facing each other of the upper side of the holder part 30 to be electrically connected to the electrode terminal of the unit battery cell 21 of the cell module 20. That is, the first bus bar 41 may be installed at one side and the other side of the upper side of the holder part 30, respectively.

The first bus bar 41 may include a first body part 411 located between through-holes 31 at the upper edge of the holder part 30, and a first lead part 413 obliquely protruding from the first body part 411.

The first body part 411 may be located at both edges of the holder part 30, respectively, and may be located at side surfaces of a plurality of through-holes 31 along both sides of the edge of the holder part 30.

The first lead part 413 may be protruded from one side of the first body part 411.

A plurality of the first lead parts 413 may be protruded from one side of the first body part 411 to be located between the through-holes 31.

The first lead part 413 may be obliquely protruded from one side of the first body part 411. For example, the first lead part 413 may be obliquely protruded from the side of the first body part 411 at an angle of 45 degrees to 60 degrees ($\alpha$).

As such, the first lead part 413 is obliquely protruded from the side of the first body part 411 in order to be stably connected in a state in which interference between parts does not occur in a process of connecting the bus bar 40 to the electrode terminal at the upper side of the holder part 30.

A plurality of the first lead parts 413 are protruded from one side of the first body part 411, and they may be protruded so as to be inserted between a plurality of through-holes 31 formed at a first column and a last column along one edge of the holder part 30. Here, the through-holes 31 may be formed in a slit shape penetrating the upper side of the holder part 30 at an inclination angle corresponding to the inclination angle of the first lead part 413.

The first lead part 413 may be protruded from the side of the first body part 411 so as to be inserted between two through-holes 31 among the plurality of through-holes 31 formed in the first row and the last row. This is to ensure that the second lead part 433 of the second bus bar 43 arranged to be adjacent to the first bus bar 41 is alternately inserted between the through-holes 31.

The first lead part 413 may be connected to the cell module 20 by a wire member 50 in a state of being located between the through-holes 31.

A plurality of wire members 50 are connected between the first lead part 413 and the electrode terminal of the cell module 20 at the upper side of the holder part 30, and may be electrically connected to the electrode terminal while stably maintaining a state in which the cell module 20 is installed.

The wire member 50 may have one end electrically connected to the electrode terminal of the cell module 20 and the other end electrically connected to the first lead part 413 of the first bus bar 41. The wire member 50 may be electrically connected thereto by bonding.

Figure 6:
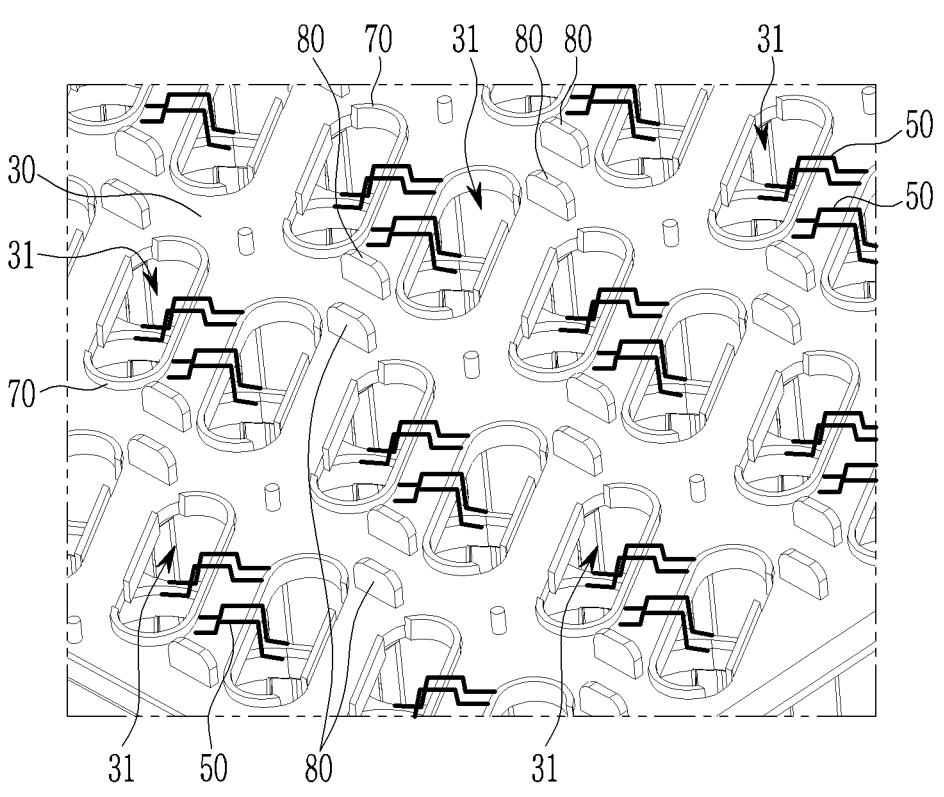
FIG. 6 illustrates a schematic perspective view of a state in which a bus bar is removed in FIG. 5.

The wire member 50 may have a portion bent in a length direction while connecting the cell module 20 and the first bus bar 41 (see FIG. 6). This is to prevent or reduce interference between adjacent parts in the process of connecting the cell module 20 and the first bus bar 41 by using the wire member 50.

As described above, by using the wire member 50, the state in which the cell module 20 is installed may be stably maintained, and the bus bar 40 and the electrode terminal may be electrically connected.

Meanwhile, in the holder part 30, the second bus bar 43 may be located between the first bus bars 41.

A plurality of second bus bars 43 may be located between the first bus bars 41 respectively arranged at one and the other edges of the holder part 30.

That is, the second bus bar 43 may be located between respective columns of the plurality of through-holes 31 formed in a plurality of columns and rows.

For example, the second bus bar 43 may include a second body part 431 having a long length in the first direction between the through-holes 31 of the holder part 30, and a plurality of second lead parts 433 obliquely protruding in a second direction crossing the first direction from respective sides of the second body part 431.

The second body part 431 is formed with the same or similar length as the first body part 411, and a plurality of second body parts 431 may be arranged at equal intervals along the first direction between the through-holes 31 between a pair of first body parts 411 located on both side edges of the holder part 30.

The second lead part 433 may be obliquely protruded from the side of the second body part 431.

The second lead part 433 may include a plurality of first extensions 433a obliquely protruding in the second direction crossing the first direction from one side of the second body part 431, and a plurality of second extensions 433b obliquely protruding in a direction opposite to the second direction from the other side of the second body part 431.

The second lead part 433 may be protruded from both sides of the second body part 431 so as to be inserted between a plurality of rows among the through-holes 31 formed in the plurality of columns and rows at the upper side of the holder part 30.

A plurality of second lead parts 433 may be protruded from one side of the second body part 431 in the second direction crossing the first direction to be located between the through-holes 31.

For example, the second lead part 433 may be obliquely protruded from the side of the second body part 431 at an angle of 45 degrees to 60 degrees ($\alpha$). That is, the second lead part 433 may be protruded from the side of the second body part 431 with the same length as or similar length to and the same angle as the first lead part 413 of the first bus bar 41.

As such, the second lead part 433 is obliquely protruded from the side of the second body part 431 in order to be stably connected in a state in which interference between parts does not occur in a process of connecting the bus bar 40 to the electrode terminal at the upper side of the holder part 30.

A plurality of second lead parts 433 are protruded from the side of the second body part 431, and the plurality of second body parts 431 may be protruded so as to be inserted between the plurality of through-holes 31 between a pair of first bus bars 41 located on both upper side edges of the holder part 30.

The second lead part 433 may be protruded from the side of the second body part 431 so as to be inserted between two through-holes 31 adjacent to upper and lower sides among the plurality of through-holes 31 formed in a plurality of columns and rows. This is to ensure that the second lead part 433 of another second bus bar 43 arranged to be adjacent to the second bus bar 43 is alternately inserted between the through-holes 31.

Meanwhile, the wire member 50 may connect the first extension 433a and a positive electrode (or negative electrode) of the electrode terminal to each other, and connect the second extension 433b and a negative electrode (or positive electrode) of the electrode terminal to each other.

Therefore, the second bus bar 43 may be electrically connected to the electrode terminal of cell module 20 while stably maintaining the installed state of cell module 20.

The wire member 50 may have a portion bent in a length direction while connecting the cell module 20 and the second bus bar 43 (see FIG. 6). This is to prevent or reduce interference between adjacent parts in the process of connecting the cell module 20 and the second bus bar 43 by using the wire member 50.

As described above, by using the wire member 50, the state in which the cell module 20 is installed may be stably maintained, and the second bus bar 43 and the electrode terminal may be electrically connected.

Meanwhile, a guide protrusion 70 may be protruded from the through-hole 31.

The guide protrusion 70 protrudes in the upper side of an opened edge of the through-hole 31, and may be protruded with a round shape corresponding to the through-hole 31 of the long slit shape. Accordingly, because the guide protrusion 70 is formed in each of the plurality of through-holes 31, it is possible to stably guide and position the bus bar 40 that is located between the through-holes 31.

Meanwhile, a stopper protrusion 80 that fixes a position of the bus bar 40 may be protruded from the holder part 30. A pair of stopper protrusions 80 may be protruded from an upper side of the holder part 30 with the body parts 411 and 431 of the bus bar 40 therebetween.

As described above, in the rechargeable battery pack 100 according to some example embodiments of the present invention, because the plurality of bus bars 40 are located at the upper side of the holder part, and the lead part for connecting the electrode terminal of the cell module is obliquely protruded, it is possible to prevent or reduce misassembly and interference of the bus bars. Therefore, it is possible to effectively prevent or reduce weakened durability and to prevent or reduce instances of a short circuit occurring due to interference and misassembly of the bus bars.

Figure 9:
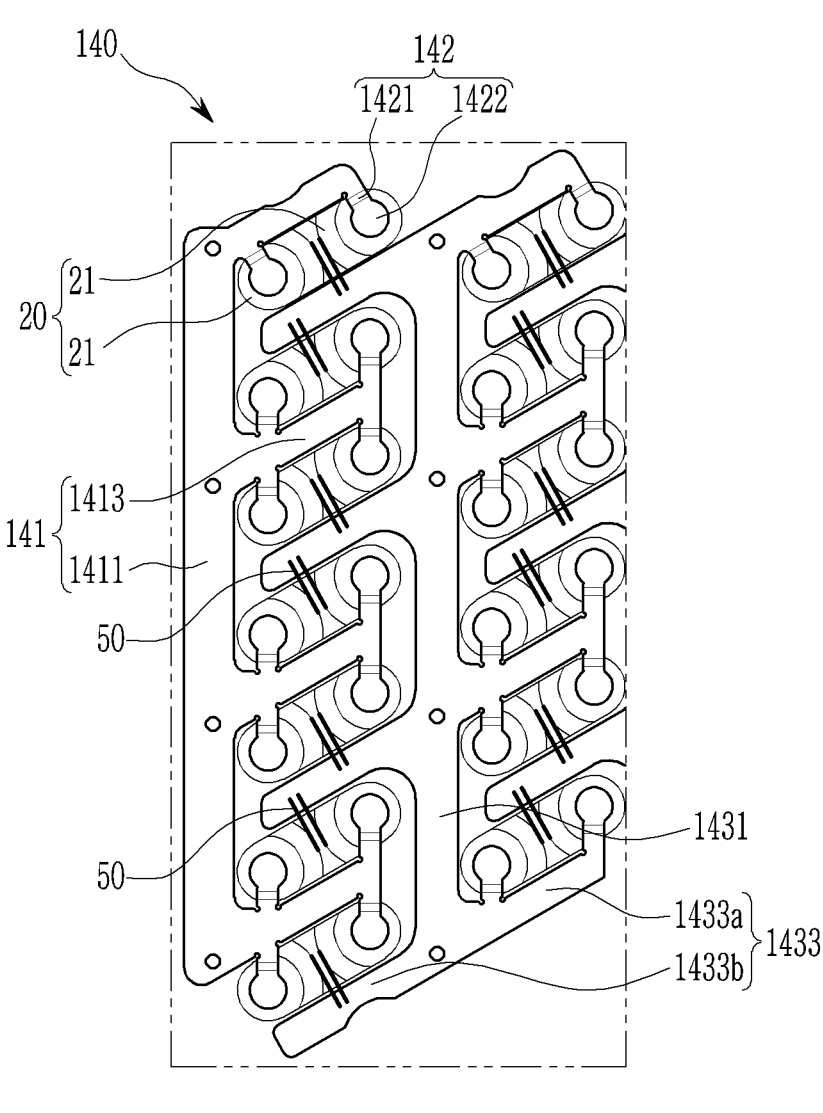
FIG. 9 illustrates a schematic view of a state in which a first composite bus bar and a second composite bus bar of a bus bar according to some example embodiments of the present invention of the present invention are located.
Figure 10:
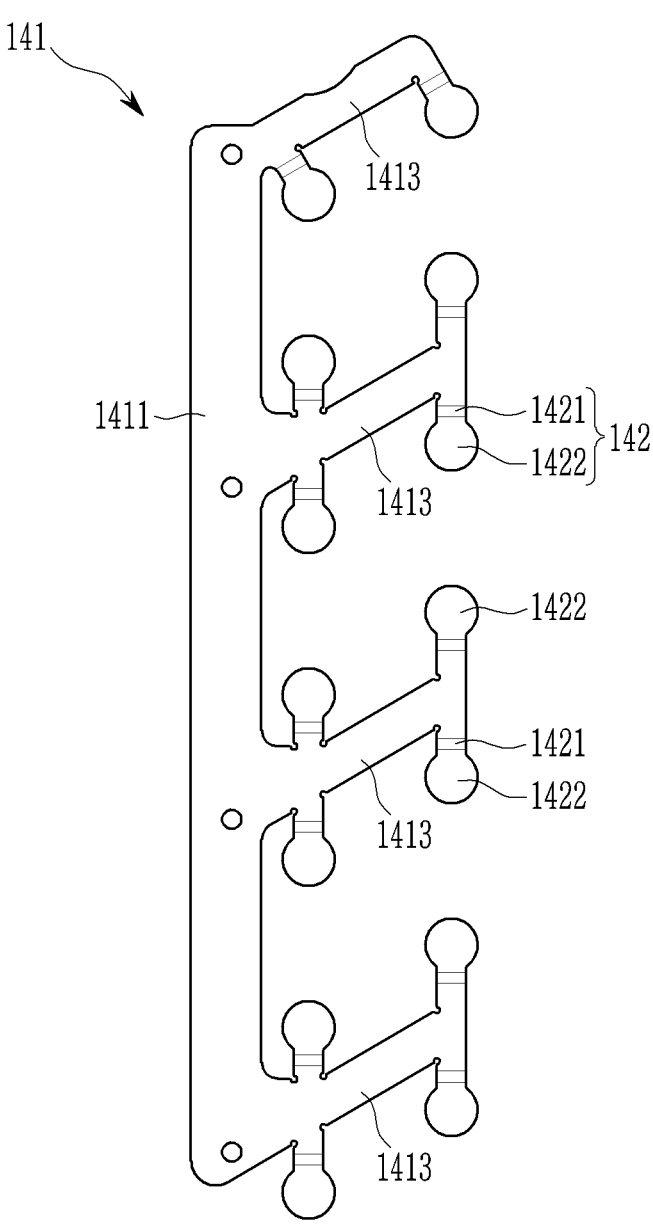
FIG. 10 schematically illustrates a top plan view of a first composite bus bar according to some example embodiments of the present invention of the present invention.
Figure 11:
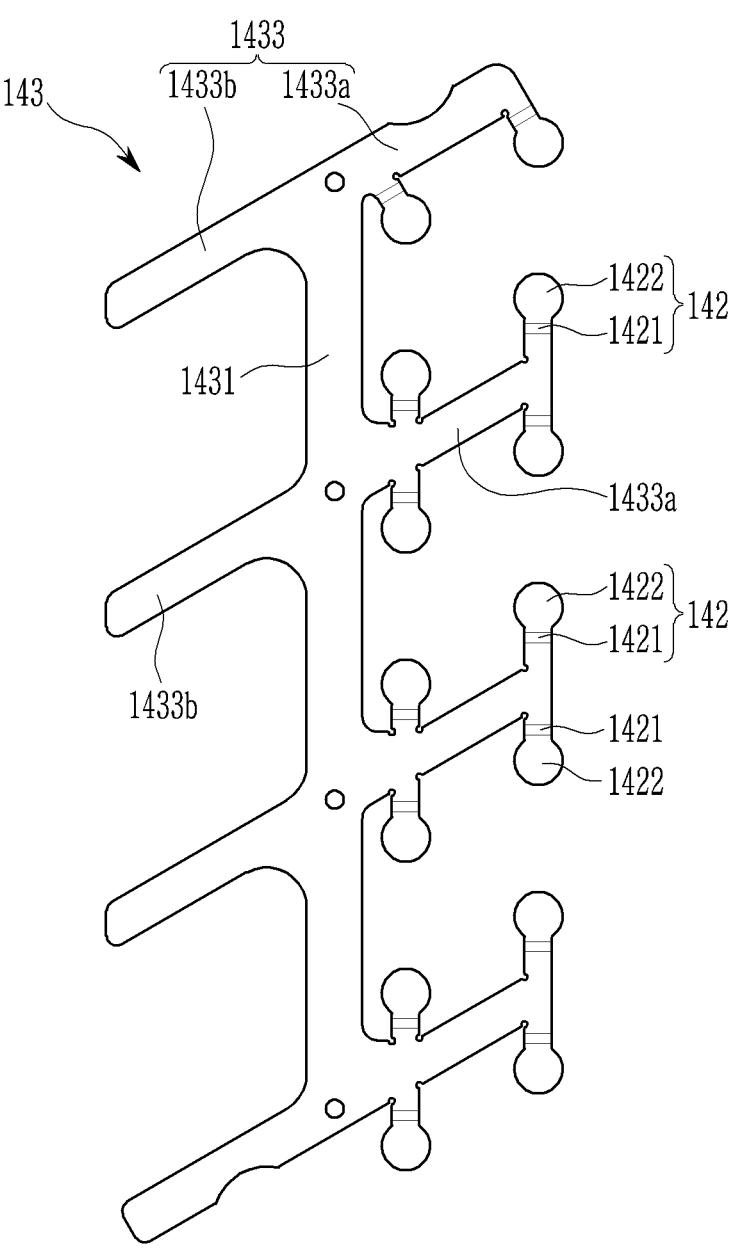
FIG. 11 schematically illustrates a top plan view of a first composite bus bar according to some example embodiments of the present invention of the present invention.

FIG. 9 illustrates a schematic view of a state in which a first composite bus bar and a second composite bus bar of a bus bar according to some example embodiments of the present invention are located, FIG. 10 schematically illustrates a top plan view of a first composite bus bar according to some example embodiments of the present invention, and FIG. 11 schematically illustrates a top plan view of a first composite bus bar according to some example embodiments of the present invention. The same reference numerals as those in FIG. 1 to FIG. 8 refer to the same or like members having the same or like functions. Some detailed description of the same reference numerals may be omitted hereinafter.

As shown in FIG. 9 to FIG. 11, a bus bar 140 of a rechargeable battery pack according to some example embodiments of the present invention may include two first bus composite bars 141 respectively located at both sides of an upper edge of the holder part 30 to be connected to the electrode terminal, and a plurality of second bus composite bars 143 located between the two first bus composite bars 141 at the upper side of the holder part 30 to be connected to the electrode terminal.

The first composite bus bar 141 may include first direction from a side surface of the through-hole 31 at both edges of an upper side of the holder part 30, and a plurality of first composite lead parts 1413 obliquely protruding in the second direction crossing the first direction from a side of the first body part 1411.

The first body part 1411 is located at both edges opposite to each other from the upper side of the holder part 30, and may be located at the side surface of the plurality of through-holes 31.

The first composite lead part 1413 may be protruded from one side of the first body part 1411.

A plurality of the first composite lead parts 1413 may be protruded from one side of the first body part 411 to be located between the through-holes 31.

The first composite lead part 1413 may be obliquely protruded from the side of the first body part 1411.

For example, the first composite lead part 1413 may be obliquely protruded from the side of the first body part 1411 at an angle of 45 degrees to 60 degrees.

As such, the first composite lead part 1413 is obliquely protruded from the side of the first body part 1411 in order to be stably connected in a state in which interference between parts does not occur in a process of connecting the bus bar 140 to the electrode terminal at the upper side of the holder part 30.

A plurality of the first composite lead parts 1413 are protruded from one side of the first body part 1411, and they may be protruded so as to be inserted between a plurality of through-holes 31 formed along both edges of the holder part 30.

Meanwhile, a lead protrusion 142 for connection to the electrode terminal may be protruded in the first composite lead part 1413. For example, one of two first composite bus bars 141 may include the lead protrusion 142, and the other thereof may not include the lead protrusion 142. For better comprehension, FIG. 10 illustrates only the first composite bus bar including the lead protrusion 142.

The lead protrusion 142 may be protruded from the first composite lead part 1413 to connect the first composite lead part 1413 and a positive electrode terminal.

For example, the lead protrusion 142 may include an extension 1421 protruding from the first composite lead part 1413 with a long length in a direction of the electrode terminal, and a welding protrusion 1422 formed at an end portion of the extension 1421.

The extension 1421 may be protruded from the first composite lead part 1413 in the direction of the electrode terminal. The welding protrusion 1422 may be protruded from an end of the extension 1421.

The welding protrusion 1422 may be protruded in a round shape at the end portion of the lead protrusion 142 to be electrically connected to the positive electrode of the unit battery cell of the cell module 20.

The welding protrusion 1422 and the positive electrode of the electrode terminal may be electrically connected by laser welding.

Meanwhile, the first composite lead part 1413 may be connected to the electrode terminal of the negative electrode of the cell module 20 by the wire member 50.

The wire member 50 is connected between the first composite lead part 1413 and the cell module 20 at the upper side of the holder part 30, and may be electrically connected to the negative electrode of the electrode terminal.

Meanwhile, a plurality of second composite bus bars 143 may be located between the two first composite bus bars 141 at the upper side of the holder part 30.

A plurality of second bus composite bars 143 may be located at equal intervals between the first bus composite bars 141 respectively located at one and the other edges of the upper side of the holder part 30.

That is, the second composite bus bar 143 is formed with a long length in the first direction between respective columns of the through-holes 31 formed at the upper side of the holder part 30 in a plurality of columns and rows.

For example, the second composite bus bar 143 may include a second body part 1431 having a long length in the first direction between the through-holes 31 of the holder part 30, and a plurality of second composite lead parts 1433 obliquely protruding in a second direction crossing the first direction from respective sides of the second body part 1431.

The second body part 1431 is formed with the same or similar length as the first body part 411, and a plurality of second body parts 431 may be arranged at equal intervals along the first direction between the through-holes 31 between two first body parts 1411 located on both edges of the upper side of the holder part 30.

The second composite lead part 1433 may be obliquely protruded from the side of the second body part 1431.

The second composite lead part 1433 may include a plurality of first composite extensions 1433a obliquely protruding in the second direction crossing the first direction from one side of the second body part 1431, and a plurality of second composite extensions 1433b obliquely protruding in a direction opposite to the second direction from the other side of the second body part 1431.

The first composite extension 1433a may be obliquely protruded from one side of the second body part 1431 at an angle of 45 degrees to 60 degrees (α).

As such, the first composite extension 1433a is obliquely protruded from the side of the second body part 1431 in order to be stably connected in a state in which interference between parts does not occur in a process of connecting the bus bar 140 to the electrode terminal at the upper side of the holder part 30.

A plurality of first composite extensions 1433a are protruded from one side of the second body part 1431, and the plurality of second body parts 431 may be protruded so as to be inserted between the plurality of through-holes 31 between a pair of first composite bus bars 141 located on both upper side edges of the holder part 30.

The first composite extension 1433a may be protruded from the side of the second body part 1431 so as to be inserted between two through-holes 31 adjacent to upper and lower sides among the plurality of through-holes 31 formed in a plurality of columns and rows.

This is to allow one first composite extension 1433a and another first composite extension 1433a between the second composite bus bars 143 to be alternately inserted between the through-holes 31.

Meanwhile, the second composite extension 1433b may be protruded to face the first composite extension 1433a with the second body part 1431 therebetween.

The second composite extension 1433b may be protruded from the other side of the second body part 1431 at the same inclination angle as that of the first composite extension 1433a. That is, the second composite extension 1433b forms a straight line with the first composite extension 1433a with the second body part 1431 therebetween, and may be protruded from the side of the second body part 1431.

The second composite extension 1433b may be electrically connected to the negative electrode terminal by the wire member 50.

Meanwhile, a lead protrusion 142 for connection to the electrode terminal may be protruded from the first composite extension 1433a.

The lead protrusion 142 may be protruded from the first composite extension 1433a to connect the first composite extension 1433a and the positive electrode terminal by laser welding. The lead protrusion 142 is the same as that formed on the first composite lead part 1413, so some detailed description thereof may be omitted.

As described above, according to some example embodiments, because the positive electrode terminal and the bus bar 140 are connected by the laser welding, and the negative electrode terminal and the bus bar 140 are connected by the wire member 50, it is possible to fix the position of the cell modules 20 and to stably connect the electrode terminal and the bus bar 140.

Figure 12:
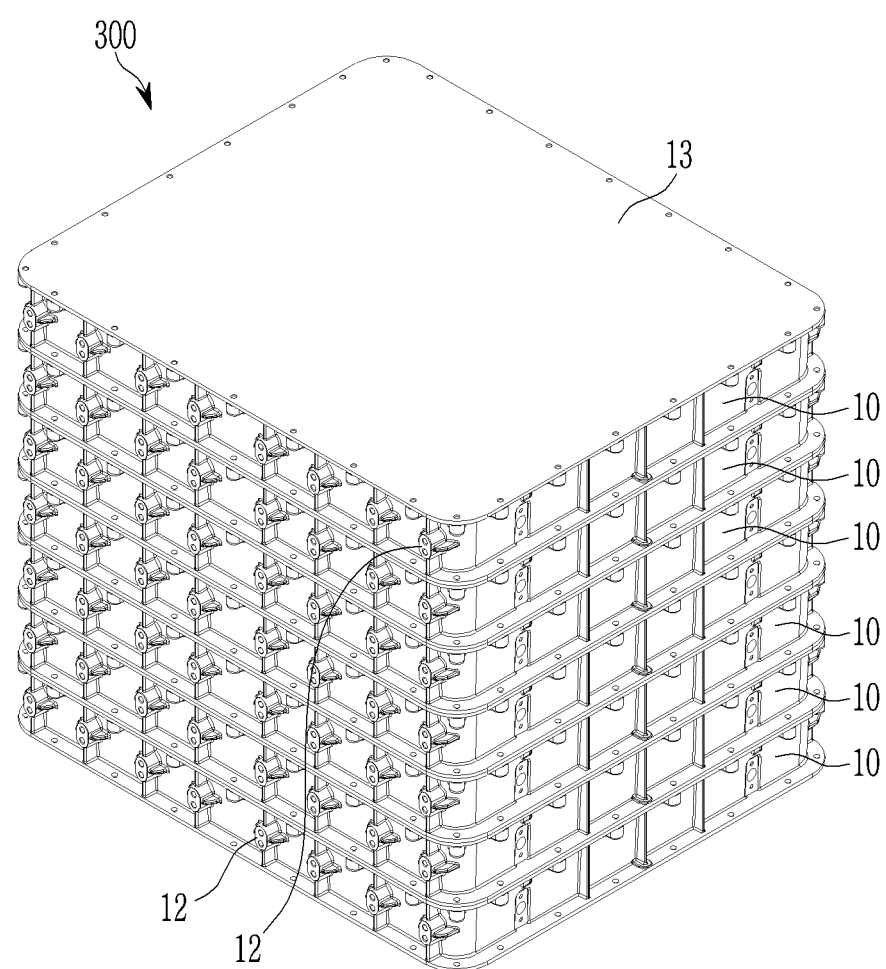
FIG. 12 schematically illustrates a perspective view of a stacked state of a rechargeable battery pack according to some example embodiments of the present invention of the present invention.

FIG. 12 schematically illustrates a perspective view of a stacked state of a rechargeable battery pack according to some example embodiments of the present invention. The same reference numerals as those in FIG. 1 to FIG. 12 refer to the same or similar members having the same or similar functions. Some detailed description of the same reference numerals may be omitted hereinafter.

As shown in FIG. 12, a rechargeable battery pack 300 according to some example embodiments of the present invention may have a structure in which the above-described rechargeable battery packs 100 having the same size are stacked in the vertical direction.

That is, in the rechargeable battery pack 300 according to some example embodiments, the rechargeable battery packs may be stacked in the vertical direction such that the accommodation spaces 11 are formed in multiple stages in the vertical direction, and the cell module fixed to the holder part 30 may be installed inside each of the accommodation spaces 11. Here, the accommodation space 11 may be formed in a vertical direction of the battery housing 10 with the same size, respectively.

In addition, the cooling water input/output part 12 may be installed at a position of each accommodation space 11 on a side surface of the battery housing 10.

In addition, in the rechargeable battery pack 300 according to some example embodiments, a connection terminal electrically connected to the bus bar may be installed in each of the rechargeable battery packs 10 stacked in multiple stages.

Accordingly, the rechargeable battery packs 10 stacked in multiple stages in the rechargeable battery packs 300 may be electrically connected to each other through the connection terminal.

As such, the rechargeable battery pack 300 according to some example embodiments of the present invention is formed in a multi-layered structure of the same size corresponding to the battery capacity, so that various battery capacities may be realized.

Figure 13:
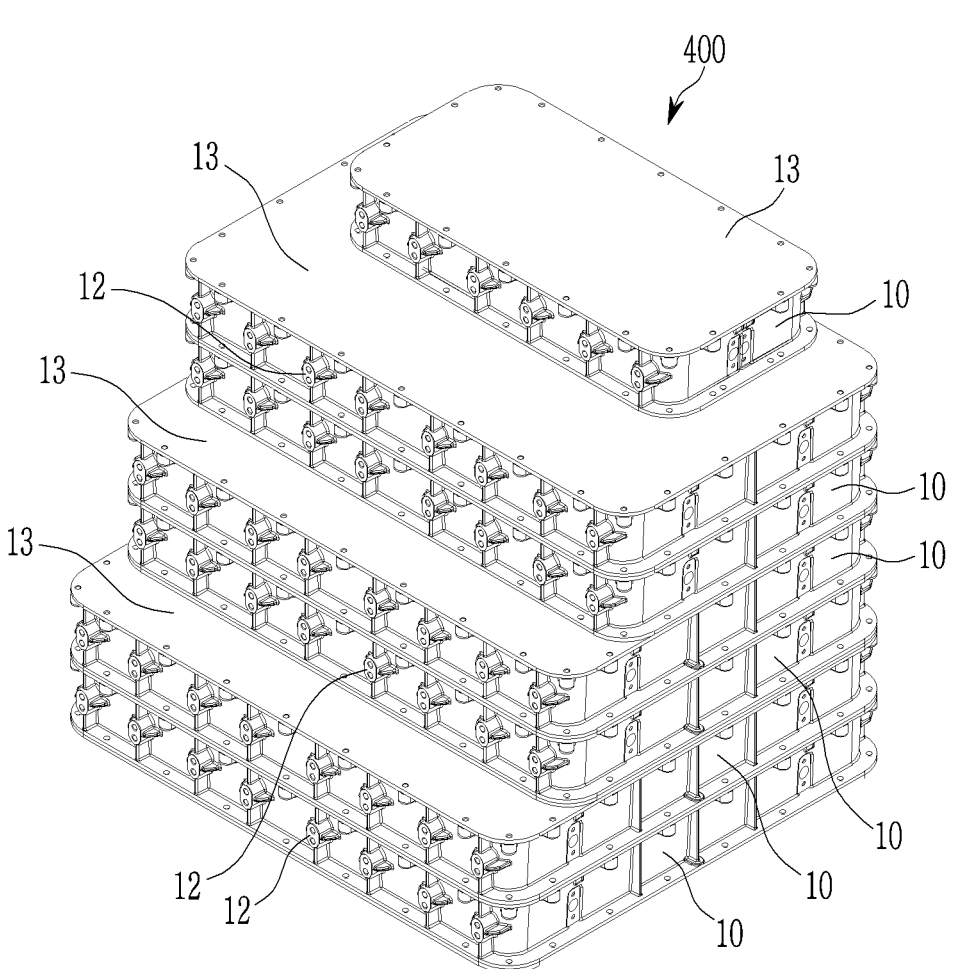
FIG. 13 illustrates a schematic perspective view of a stacked state of a rechargeable battery pack according to some example embodiments of the present invention of the present invention.

FIG. 13 illustrates a schematic perspective view of a stacked state of a rechargeable battery pack according to some example embodiments of the present invention. The same reference numerals as those in FIG. 1 to FIG. 12 refer to the same or similar members having the same or similar functions. Some detailed description of the same reference numerals may be omitted hereinafter.

As shown in FIG. 13, in a rechargeable battery pack 400 according to some example embodiments of the present invention, the above-described rechargeable battery packs 100 having different sizes may be stacked in the vertical direction.

That is, in the rechargeable battery pack 400 according to some example embodiments, the rechargeable battery pack may be stacked in multiple stages in different sizes in the vertical direction such that the accommodation spaces 11 are formed in multiple stages in the vertical direction, and the cell module fixed to the holder part 30 may be installed inside each of the accommodation spaces 11.

Here, the accommodation spaces 11 may be formed in a vertical direction of the battery housing 10 with different sizes.

That is, because the rechargeable battery pack 400 according to some example embodiments of the present invention is formed in a multi-stacked type with reduced size in the vertical direction, it may be possible to improve a degree of freedom of installation.

In addition, in the rechargeable battery pack 400 according to some example embodiments, a connection terminal electrically connected to a bus bar may be installed in each of the rechargeable battery packs 10 stacked in multiple stages.

Accordingly, the rechargeable battery packs 10 stacked in multiple stages in the rechargeable battery packs 300 may be electrically connected to each other through the connection terminal.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims and their equivalents.

| Description of Some of the Reference Symbols | |
|---|---|
| 10 | battery housing |
| 11 | accommodation space |
| 12 | cooling water input/output part |
| 20 | cell module |
| 21 | unit battery cell |
| 30 | holder part |
| 31 | through-hole |
| 40, 140 | bus bar |
| 41 | first bus bar |
| 411 | first body part |
| 413 | first lead part |
| 43 | second bus bar |
| 431 | second body part |
| 433 | second lead part |
| 433a | first extension |
| 433b | second extension |
| 50 | wire member |
| 51 | fixed wire |
| 70 | guide protrusion |
| 80 | stopper protrusion |
| 141 | first composite bus bar |
| 1411 | first body part |
| 1413 | first composite lead part |
| 142 | lead protrusion |
| 1421 | extension |
| 1422 | welding protrusion |
| 143 | second composite bus bar |

-continued

| Description of Some of the Reference Symbols | |
|---|---|
| 1431 | second body part |
| 1433 | second composite lead part |
| 1433a | first composite extension |
| 1433b | second composite extension |

What is claimed is:

1. A rechargeable battery pack comprising:
a battery housing having an accommodation space;
a plurality of cell modules in the accommodation space and having a plurality of unit battery cells connected to each other, and obliquely arranged;
a holder part supporting the cell modules inside the battery housing;
a first bus bar at an upper side of the holder part and connecting a first group of electrode terminals of the unit battery cells, the first bus bar extending along a direction; and
a second bus bar at the upper side of the holder part and connecting a second group of electrode terminals of the unit battery cells, the second bus bar being adjacent to the first bus bar and extending along the direction,
wherein the first bus bar is between the cell modules at the upper side of the holder part, and a lead part connected to an electrode terminal from among the electrode terminals is obliquely protruded from at least one side of the first bus bar, wherein
a plurality of through-holes through which the electrode terminal of the unit battery cell is exposed is formed in the upper side of the holder part,
the through-holes forms a plurality of columns and rows on the upper side of the holder part and are obliquely formed to correspond to an arrangement of the cell modules,
the first bus bar is disposed between the plurality of through-holes,
a guide protrusion is protruded from an edge of a through-hole from among the through-holes, and
the lead part of the first bus bar protruding from the at least one side of the first bus bar extends from a line passing through a center of a column of electrode terminals of a first column of the unit battery cells aligned along the direction and located between the first and second bus bars to a line passing through a center of a column of electrode terminals of a second column of the unit battery cells aligned along the direction that is adjacent to the first column of the unit battery cells and located between the first and second bus bars.

2. The rechargeable battery pack of claim 1, further comprising:
a plurality of third bus bars arranged in a pair at both sides of an edge of the upper side of the holder part and connected to the electrode terminal.

3. The rechargeable battery pack of claim 2, wherein
a first one of the third bus bars includes:
a first body part extending in a first direction between the through-holes at both sides of the edge of the holder part; and
a plurality of first lead parts that are obliquely protruded in a second direction crossing the first direction from a side of the first body part to be inserted between the through-holes.

4. The rechargeable battery pack of claim 3, wherein
a first lead part from among the first lead parts protrudes from a side of the first body part at an angle ranging from 45 degrees to 60 degrees.

5. The rechargeable battery pack of claim 4, wherein
the first lead part and the electrode terminal of a cell module from among the cell modules are connected by a wire member at the upper side of the holder part.

6. The rechargeable battery pack of claim 2, wherein
the first bus bar includes:
a second body part extending in a first direction between the through-holes; and
a plurality of second lead parts obliquely protruding in a second direction crossing the first direction from both sides of the second body part.

7. The rechargeable battery pack of claim 6, wherein
a second lead part from among the second lead parts includes:
a plurality of first extensions obliquely protruding in the second direction crossing the first direction from one side of the second body part; and
a plurality of second extensions obliquely protruding in a direction opposite to the second direction from the other side of the second body part.

8. The rechargeable battery pack of claim 7, wherein
the first and second bus bars are between a plurality of columns of the through-holes at the upper side of the holder part, and
the second lead part protrudes from a side of the first bus bar to be located between a plurality of rows of the through-holes.

9. The rechargeable battery pack of claim 8, wherein
the second lead part and the electrode terminal of a cell module from among the cell modules are electrically connected by a wire member at the upper side of the holder part.

10. The rechargeable battery pack of claim 1, further comprising:
a plurality of first composite bus bars located at an edge of the upper side of the holder part and connected to the electrode terminal; and
a plurality of second composite bus bars located at a side of the first composite bus bar at the upper side of the holder part and connected to the electrode terminal, and
a lead protrusion electrically connected to the electrode terminal protrudes from each of a first composite bus bar from among the first composite bus bars and a second composite bus bar from among the second composite bus bars.

11. The rechargeable battery pack of claim 10, wherein
a first composite bus bar from among the first composite bus bars includes:
a first body part in a first direction at side surfaces of the through-holes at both edges of the upper side of the holder part; and
a plurality of first composite lead parts obliquely protruding in a second direction crossing the first direction from the side of the first body part, and
a lead protrusion connected to the electrode terminal protrudes from a side of a first composite lead part from among the first composite lead parts.

12. The rechargeable battery pack of claim 11, wherein
the first composite lead part protrudes from a side of the first body part at an angle ranging from 45 degrees to 60 degrees.

13. The rechargeable battery pack of claim 12, wherein
the lead protrusion is electrically connected to a positive electrode of the electrode terminal.

14. The rechargeable battery pack of claim 13, wherein the second composite bus bar includes:

a second body part extending in the first direction between the through-holes of the holder part; and a plurality of second composite lead parts obliquely protruding in the second direction crossing the first direction from both sides of the second body part, and the second composite lead part protrudes from each of both opposite sides of the second body part, and a lead protrusion electrically connected to the electrode terminal protrudes from a side of the second composite lead part.

15. The rechargeable battery pack of claim 14, wherein a second composite lead part from among the second composite lead parts includes:

a plurality of first composite extensions obliquely protruding in the second direction crossing the first direction from one side of the second body part; and a plurality of second composite extensions obliquely protruding in a direction opposite to the second direction from the other side of the second body part, and a lead protrusion connected to the electrode terminal protrudes from a side of each of a first composite extension from among the first composite extensions and a second composite extension from among the second composite extensions.

16. The rechargeable battery pack of claim 15, wherein the second composite extension is electrically connected to a negative electrode of the electrode terminal of a cell module from among the cell modules by a wire member.

17. The rechargeable battery pack of claim 1, further comprising a stopper protrusion fixing a position of the first bus bar protruding from the holder part, and the stopper protrusion protrudes from the upper side of the holder part in a pair with a body part therebetween.

\* \* \* \* \*